Patented July 29, 1930

1,771,785

UNITED STATES PATENT OFFICE

MORTIMER T. HARVEY, OF NEW YORK, N. Y., ASSIGNOR, BY DIRECT AND MESNE ASSIGNMENTS, TO THE HARVEL CORPORATION, A CORPORATION OF NEW JERSEY

RUBBER-LIKE SUBSTANCE FROM CASHEW-NUT-SHELL OIL AND METHOD FOR PRODUCING THE SAME

No Drawing.   Application filed November 28, 1925.   Serial No. 72,037.

The present invention relates to compositions of matter which are reaction products of the oil found in the shell surrounding the kernel of the cashew nut. The invention relates further to reaction products of cashew nut shell oil with glycerine or with other polyhydric alcohols or homologs of glycerine. The invention relates further to gylcerine and cashew nut shell oil reaction products which have properties common to various kinds and conditions of rubber. These products are suitable for uses to which rubber is put and for use in the arts generally. The invention also relates to methods, processes, and steps for producing the reaction products. These products for a great many purposes may properly be termed artificial rubber.

In the preparation of these reaction products various proportions of glycerine and cashew nut shell oil or distillates thereof are used to produce various products. Reaction is best produced by heat or by some thickening reagent such as sulphuric acid, or some other acid or by ammonia or the like. When heat is used for bringing about the reaction the two ingredients may be mixed and then heated, or one or both of them may be heated before they are brought together. The oil may be heated to temperatures up to its flash point for the purpose of driving out water before mixing with the glycerine. The reaction products vary from a jelly comparable to rubber latex to thick substances having characteristics of congealed rubber.

The following are set forth as illustrative examples of methods of preparing reaction products of cashew nut shell oil and glycerine but it is intended that the breadth and scope of invention as claimed is not limited thereby.

In one case one part of the oil and one part of glycerine c. p. by volume were mixed and refluxed with an air condenser for about three hours at a temperature beginning at about 245° C. and increasing as the reaction proceeds. The product was at room temperature of a thickness comparable to petroleum jelly and was sticky and slightly gummy. This product when heated at 104° C. for about 2-3 hours became hard, tough and resilient and offered considerable resistance to burning when a flame was applied to it.

In another case three parts of the oil and one part of glycerine c. p. by volume were mixed and heated under an air reflux condenser at 245° C. for about fifteen minutes, the flame burner being removed when flashing occurred. The product when spread in a thin film dried quickly to a tough sticky film. A quantity of the product on cooling thickened and became a rubbery mass which in a flame burned very slowly. No color change occurred when a thin film of the product was immersed for twenty minutes in boiling water.

Five parts of the oil and two parts of c. p. glycerine were refluxed at about 245° C. for thirty minutes and then allowed to stand for twenty-four hours. The resultant substance was tough, stringy, and sticky and at first melted at 104° C. but continued heating thickened it. The thickened material had the general appearance of rubber and stretched somewhat like rubber. When a quantity of this material was mixed with about 4-12 per cent of its weight of powdered sulphur and heated at 104° C. for about 3 hours it congealed and became tough and stringy. This sulphur vulcanized product had the general appearance of rubber and would return to its original form and shape when distorted. When rubbed briskly between the hands it gave off an odor characteristic of rubber and a piece held in a flame had the smell of burning rubber. The product resists the oxidizing action of nitric acid better than does rubber. When mixed with 20% to 40% of sulphur and heated at about 300° C. a good "rubber" is produced. Higher percentages of sulphur produce increasingly harder "rubber."

When heated with the sulphur chlorides a material similar to granular or powdered hard rubber is produced and this material is softened at increased temperature and compressible into a discrete mass.

For some purposes the vulcanizer is mixed with one of the ingredients, oil or glycerine, before the reaction is produced.

Many kinds of products can be produced by varying the proportions of glycerine and oil used even through a wide range of variation. Resultant gums may be produced which are elastic and the elasticity and toughness increase with the amount of glycerine used.

These reaction products, including the "vulcanized" products, are soluble in commercial solvents such as carbon disulphide, naptha, phenol, benzine and so on. The solutions when spread on the surface of a fabric, paper or other material and dried at 100° C. forms a tough elastic film or coating.

I claim:

1. Reaction product of glycerine and cashew nut shell oil.

2. Reaction product of glycerine and cashew nut shell oil in the respective proportions of two parts to five parts by volume, substantially.

3. The product obtained by reacting glycerine with oil from the shell of the cashew nut to form rubber like material and treating such material with a vulcanizer.

4. The product obtained by reacting glycerine with oil from the shell of the cashew nut to form a rubber like material and treating such material with a vulcanizer comprising sulphur.

5. The method of producing a composition which comprises heating glycerine with cashew nut shell oil.

6. The step in the method of producing a composition of matter which step comprises heating glycerine and cashew nut shell oil at a temperature of about 240° C.

7. The method of producing a composition of matter which comprises heating glycerine with cashew nut shell oil at a temperature beginning at about 240° C., and higher as the reaction progresses.

8. The method of producing a composition of matter which comprises heating glycerine and cashew nut shell oil at a temperature ranging upwardly from about 240° C.

9. The method of producing a composition of matter which comprises heating glycerine with cashew nut shell oil in proportions respectively of about two parts to five by volume.

10. The method of producing a composition of matter which comprises heating glycerine with cashew nut shell oil in proportions respectively of about two parts to five by volume at temperatures ranging upwardly from about 240° C.

11. The method of producing a composition of matter which comprises heating glycerine with cashew nut shell oil at temperatures ranging upwardly from about 240° C. and until a desired consistency is obtained.

12. The method of hardening the reaction products of cashew nut shell oil and glycerine which comprises treating the product with a vulcanizer.

13. Rubber substitute having oil from the shell of the cashew nut as the base thereof and having the characteristic resiliency of natural rubber.

14. Rubber substitute having cashew nut shell oil as a base thereof.

15. A reaction product of glycerine and cashew nut shell oil said product having a characteristic of resiliency similar to that of rubber.

16. Rubber substitute having cashew nut shell liquid as the base thereof and being set with a vulcanizer.

17. Rubber substitute having cashew nut shell liquid as the base thereof and being set with a vulcanizer comprising sulphur.

Signed at New York, in the county of New York and State of New York, this 24th day of November, A. D. 1925.

MORTIMER T. HARVEY.